3,057,911
PROCESS OF MANUFACTURING 2,2-DIMETHYL-1,3-PROPANEDIOL MONO(HYDROXYPIVALATE)
Gaylord K. Finch, Kingsport, Tenn., assignor to Eastman Kodak Company, Rochester, N.Y., a corporation of New Jersey
Filed Dec. 2, 1959, Ser. No. 856,808
3 Claims. (Cl. 260—484)

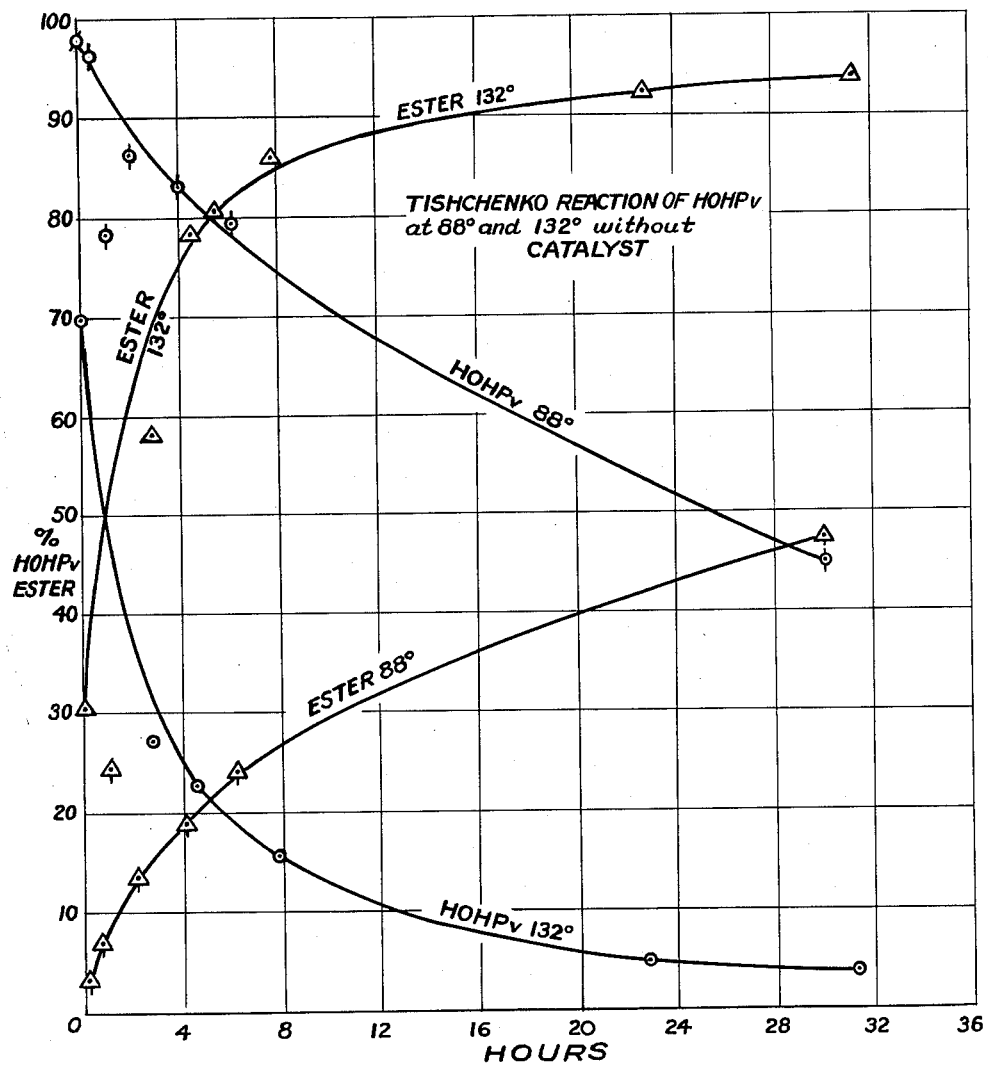

This invention relates to a new process of preparing 2,2 - dimethyl - 1,3-propanediol mono(hydroxypivalate). More particularly it relates to the preparation of this ester from hydroxypivaldehyde, according to the equation

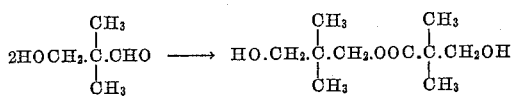

Franke and Kohn, Monatsh. 25, 865 (1904) have described the preparation of 2,2-dimethyl-1,3-propanediol mono(hydroxypivalate) by the condensation of hydroxypivaldehyde using MgOEtI as catalyst; this gave a 59% yield of the ester. Claisen, Ber. 20, 649 (1887), in studying the Cannizzaro reaction, found that the use of sodium alkoxides with benzaldehyde gave benzyl benzoate. Tishchenko (J. Russ. Phys. Chem. Soc. 38, 355 (1906) then showed that aluminum alkoxide gave better results, and was operative with aliphatic aldehydes as well as with aromatic aldehydes. However, all Tishchenko reactions have had two essential requirements: (1) the use of a metal alkoxide as a catalyst, usually in rather large amounts and (2) the absence of water, as any water immediately destroys the catalyst and stops the reaction. Both R. C. Fuson, "Advanced Organic Chemistry," John Wiley & Sons, New York, 1950, p. 359, and E. E. Royals, "Advanced Organic Chemistry," Prentice Hall, Inc., New York, 1954, p. 723, point out in their books that the Tishchenko reaction is not widely applied as the catalyst is easily poisoned and soon loses its activity.

I have found that 2,2-dimethyl-1,3-propanediol mono(hydroxypivalate) can be made from hydroxypivaldehyde without the use of a catalyst, by heating hydroxypivaldehyde at a temperature in the range of 40°–200° C., preferably in the range of 60°–150° C., for a suitable length of time depending on the temperature used. The aldehyde is converted in good yields to the ester, which can then be purified by recrystallization or vacuum distillation. To prevent oxidation of the aldehyde it is desirable but not necessary to keep the reaction under an inert atmosphere such as nitrogen or carbon dioxide. My method does not require the crude aldehyde to be very carefully and completely dried. The direct reaction of two moles of the aldehyde is much more economical than the oxidation of 1 mole of the aldehyde to the acid, the reduction of another mole to the glycol, and the esterification of these two products.

The hydroxypivaldehyde may be in refined form, or it may be used in the crude form as obtained by stripping unreacted isobutyraldehyde from the top layer of the crude reaction mixture resulting from the condensation of formalin with isobutyraldehyde using aqueous potassium carbonate as catalyst. If it is desired to carry out the condensation of the hydroxypivaldehyde below the melting point of its dimer, water can be added to give a mixture that is liquid. For example, addition of 10% water to crude stripped hydroxypivaldehyde will give a mixture that remains liquid at 60° C. for several days. I have carried out work to find out how much water can be present without preventing the reaction. Starting with crude stripped hydroxypivaldehyde (assay 90%, the remainder being water, isobutyraldoxane and the hydroxypivalaldehyde-isobutyraldehyde aldoxane), mixtures were made of 1:1, 2:1 and 4:1 parts by weight of water to hydroxypivalaldehyde. Samples of each of these mixtures were held at 60°, 80° and 95° C., and periodic samples were analyzed for ester and for aldehyde. At 60° C., a 1:1 ratio of water to aldehyde caused essentially complete inhibition of the Tishchenko reaction, but at 80° and 95° C., the 1:1 ratio only decreased the rate of reaction. With 2:1 and 4:1 ratios, there was no reaction even at 80° or 95° C. Therefore, at temperatures in the 80°–100° C. range, this unusual reaction takes place even with an equal weight of water present.

My invention is illustrated but not limited by the following examples.

*Example 1.*—Hydroxypivalaldehyde was prepared from formalin and isobutyraldehyde in the presence of potassium carbonate catalyst, as described in U.S. Patent 2,811,562. The unreacted isobutyraldehyde was stripped out up to a maximum base temperature of 80° C. at reduced pressure. The crude stripped product was then separated from the water layer and was suitable for use in the preparation of 2,2-dimethyl-1,3-propanediol mono(hydroxypivalate). If the stripping temperature is too high or the time too long, some ester is formed; however, a 60° to 80° C. temperature is necessary to cause breakdown of the byproducts formed during the condensation of the formaldehyde and isobutyraldehyde. The stripped crude product contained by analysis 90% hydroxypivalaldehyde and about 11% water. This stripped material was held at about 90° C. for approximately 60 hours, at the end of which time it analyzed on a water free basis as 24% hydroxypivalaldehyde and 75% 2,2-dimethyl-1,3-propanediol mono(hydroxypivalate). Another large batch prepared in a similar manner was held at about 80° to 90° C. for 18 days, at the end of which time it analyzed as 13% hydroxypivalaldehyde and 83%, 2,2-dimethyl-1,3-propanediol mono(hydroxypivalate).

*Example 2.*—Hydroxypivalaldehyde prepared in the manner of Example 1 was purified by distillation at reduced pressure and by recrystallization to give a product that analyzed as 97.7% hydroxypivalaldehyde and 3.3% ester. This material was heated to 88° C., which required half an hour, and was then held at that temperature for 30 hours. Periodic samples were taken and analyzed separately for hydroxypivalaldehyde and for 2,2 - dimethyl - 1,3 - propanediol mono(hydroxypivalate). The results are given in Table I and FIGURE I.

*Table I*

| Time (Hrs.) | Temperature 88° C. average | |
|---|---|---|
| | Percent Aldehyde | Percent Ester |
| 0 | 97.7 | 3.3 |
| 0.5 | 96.2 | 6.7 |
| 2.0 | 86.4 | 13.3 |
| 4.0 | 83.3 | 18.6 |
| 6.0 | 79.8 | 24.0 |
| 30.0 | 44.5 | 47.3 |

It will be realized that there was some experimental error in the analyses, as the sums of percent aldehyde and percent ester are not exactly 100%.

*Example 3.*—Hydroxypivalaldehyde prepared as in Example 1 was heated to 132° C. The results are given in Table II and FIGURE I.

Table II

| Time (Hrs.) | Temperature 132° C. average | |
|---|---|---|
| | Percent Aldehyde | Percent Ester |
| 0 | 69.8 | 30.6 |
| 2.75 | 27.3 | 64.3 |
| 4.4 | 22.8 | 78.6 |
| 5.4 | 22.6 | 80.3 |
| 7.7 | 15.5 | 86.2 |
| 22.8 | 4.8 | 92.9 |
| 31.2 | 3.6 | 93.9 |

In all of the examples, the ester was purified by several recrystallizations from heptane containing 10% acetone and was identified by its melting point, 48–51° C.; boiling point, 125–128° C. at 1 to 2 mm. (with decomposition); and by a mixed melting point with a sample of the ester prepared from 2,2-dimethyl-1,3-propanediol and hydroxypivalic acid.

In FIGURE I, attached to this specification and forming a part thereof, the values on the abscissa represent hours of heating at the respective temperatures shown on the graphs, while the values on the ordinate represent the respective percentages of aldehyde and ester at the indicated times and temperatures. "HOHPv" stands for hydroxypivalaldehyde, and "Ester" means 2,2-dimethyl-1,3-propanediol mono(hydroxypivalate).

2,2-dimethyl-1,3-propanediol mono(hydroxypivalate) has been used to prepare polyesters which show promise in the field of synthetic lubricant additives and as plasticizers for polyvinyl chloride. It is also a useful chemical intermediate, having one ester group and two alcohol groups present.

I claim:
1. A process of manufacturing 2,2-dimethyl-1,3-propanediol mono(hydroxypivalate) which comprises heating hydroxypivalaldehyde, in the absence of a catalyst, at a temperature in the range of 88°–200° C. for at least 4 hours.
2. A process of manufacturing 2,2-dimethyl-1,3-propanediol mono(hydroxypivalate) which comprises heating hydroxypivalaldehyde, in the absence of a catalyst, at a temperature in the range of 80°–100° C., for at least four hours in the presence of not more than an equal weight of water.
3. A process of manufacturing 2,2-dimethyl-1,3-propanediol mono(hydroxypivalate) which comprises heating a reaction mass consisting essentially of a starting material selected from the group consisting of refined hydroxypivalaldehyde and crude hydroxypivalaldehyde at a temperature in the range of 132°–200° C. for at least 4 hours.

References Cited in the file of this patent
UNITED STATES PATENTS
2,811,562   Hagemeyer _____ Oct. 29, 1957
OTHER REFERENCES
King et al., The Fundamentals of College Chemistry, second edition, p. 218 (1954).